(12) United States Patent
Richard et al.

(10) Patent No.: US 11,314,932 B2
(45) Date of Patent: Apr. 26, 2022

(54) METHOD FOR GENERATING A MESSAGE FORM

(71) Applicant: BULL SAS, Les Clayes sous Bois (FR)

(72) Inventors: Julien Richard, Vitrolles (FR); Fabien Pigal, Aix en Provence (FR); Angélique Galtier, Paris (FR)

(73) Assignee: ATOS FRANCE, Bezons (FR)

( * ) Notice: Subject to any disclaimer, the term of this patent is extended or adjusted under 35 U.S.C. 154(b) by 135 days.

(21) Appl. No.: 15/776,293

(22) PCT Filed: Nov. 15, 2016

(86) PCT No.: PCT/EP2016/077752
§ 371 (c)(1),
(2) Date: May 15, 2018

(87) PCT Pub. No.: WO2017/085066
PCT Pub. Date: May 26, 2017

(65) Prior Publication Data
US 2018/0322104 A1    Nov. 8, 2018

(30) Foreign Application Priority Data
Nov. 16, 2015    (FR) ..................... 1502393

(51) Int. Cl.
*G06F 40/174*    (2020.01)
*G06F 40/143*    (2020.01)
*G06F 3/0482*    (2013.01)

(52) U.S. Cl.
CPC .......... *G06F 40/174* (2020.01); *G06F 3/0482* (2013.01); *G06F 40/143* (2020.01)

(58) Field of Classification Search
CPC .............................. G06F 40/14; G06F 3/0482
See application file for complete search history.

(56) References Cited

U.S. PATENT DOCUMENTS

2002/0152244 A1    10/2002   Dean et al.
2002/0188595 A1*   12/2002   Underseth ................. G06F 8/36
(Continued)

OTHER PUBLICATIONS

International Search Report as issued in International Patent Application No. PCT/EP2016/077752, dated Dec. 9, 2016.
(Continued)

*Primary Examiner* — Ariel Mercado
*Assistant Examiner* — Jenq-Kang Chu
(74) *Attorney, Agent, or Firm* — Arc IP Law, PC; Joseph J. Mayo

(57) ABSTRACT

A method for generating a message form includes: acquiring a dataset received by a communication interface, the dataset including an object, an attribute defining an identifier of the object and a number defining a number of identified objects; storing the received data in a memory, the memory further including predefined objects and a set of input controls, each object being associated with at least one input control; comparing each received object with the predefined objects stored in the memory so as to determine, of the received objects, those that are already referenced in the memory; selecting a set of input controls associated with the objects determined in the comparing step by a processor, each object being associated with at least one input control; generating a form comprising a list of input controls selected depending on the number of determined objects and on the attributes of each determined object.

15 Claims, 2 Drawing Sheets

(56) References Cited

U.S. PATENT DOCUMENTS

2003/0172193 A1* 9/2003 Olsen .................. G06F 8/38
 719/315
2012/0197864 A1* 8/2012 Bourdoncle ............ G06F 16/31
 707/711
2015/0324445 A1* 11/2015 Tseng .................. G06F 16/285
 726/28

OTHER PUBLICATIONS

Sudnikovich, W. P., et al., "Extensible Battle Management Language as a Transformation Enabler," Simulation, vol. 80, No. 12, Dec. 2004, XP055284566, 13 pages.
Song, K., et al., "An Automated Generation of XForms Interfaces for Web Services," Web Services, ICWS 2007, IEEE, Jul. 2007, XP031119998, ISBN: 978-0-7695-2924-0, pp. 856-863.
Spillner, J., et al., "Analysis on Inference Mechanisms for Schema-driven Forms Generation," Berliner XML-Tage, 2007, XP055284578, Retrieved from the Internet: URL:http://citeseerx.ist.psu.edu/viewdoc/download?doi=10.1.1.88.5947&rep=rep1&type=pdf, [retrieved on Jun. 29, 2016], 12 pages.
Van Welie, M., et al., "Interaction Patterns in User Interfaces," 2000, XP055284422, Retrieved from the Internet: URL:https://www.welie.com/papers/PLoP2k-Welie.pdf, [retrieved on Jun. 29, 2016], 26 pages.
Lay, P., et al., "Transforming XML Schemas into Java Swing GUIs," Informatik Sep. 2004, XP001167396, Retrieved from the Internet: URL:http://subs.emis.de/LNI/Proceedings/Proceedings50/GI-Proceedings.50-58.pdf, [retrieved on Jun. 29, 2016], 11 pages.
Hsieh, S.-H., et al., "XSFORM: A Schema-Driven Form-Based XML Information Processor," ISARC 2004 21$^{st}$ International Symposium on Automation and Robotics in Construction, XP055284272, Retrieved from the Internet: URL:https://www.baufachinformation.de/kostenlos.jsp?sid=46436DEC063FA81DF5C8AD4FC23C342A&id=09111000387&link=http://www.irbnet.de/daten/iconda/CIB13674.pdf, [retrieved on Jun. 29, 2016], 6 pages.

* cited by examiner

METHOD FOR GENERATING A MESSAGE FORM

CROSS-REFERENCE TO RELATED APPLICATIONS

This is the U.S. National Stage of PCT/EP2016/077752, filed Nov. 15, 2016, which in turn claims priority to French Application No. 15/02393, filed Nov. 16, 2015, the entire contents of all applications are incorporated herein by reference in their entireties.

FIELD

The field of the invention relates to the generation of a message form for the edition of command messages within a tactical information system. More specifically, the invention pertains to operations targeting the automatic processing of the generation of input controls to define new messages.

PRIOR ART

At present, messaging systems usually make it possible to have available a message body and an option making it possible to include attachments. Other objects may be included in a message such as a predefined signature or a priority indicator according to the nature of the message. Generally, the objects that are linked to a message are integrated via a form of a client or that of a server which makes it possible to define intuitively the characteristics of the objects to include. Certain messaging systems extend the notion of objects while making it possible to define the attributes thereof in the edition form. As an example, certain messaging systems make it possible to define a position or hypertext links through an adequate input control.

However, the input controls generally allow great freedom for defining the objects of a message. The latter notably make it possible to generate messages relatively simply between users sharing a same messaging system.

In the field of tactical telecommunications, notably deployed in state bodies or in organisations that have to standardise their exchanges, the definition of messaging systems is more constrained than conventional messaging systems used in consumer software. The possibilities of defining objects freely are reduced in so far as this freedom may lead to errors of appreciation or instead differences in implementation of nomenclatures or standards used by different organisations communicating together. It is recommended to limit or to constrain the input controls from the moment that information has to be transmitted in a predefined formalism in a certain manner.

There thus exists a need to define in a constrained manner the different values describing a particular object to transmit. As an example, when a position has to be documented in a message, certain input controls make it possible to limit human errors as to the definition of the latitudes and the longitudes to document in a field. One solution consists, for example, in a limitation of the permitted values in a data field accessible to a user. Another solution consists in generating a contextual map accessible on a screen and to make it possible to define a position to transmit by means of a pointer.

The definition of messages in the messaging system evolves rapidly notably to integrate more and more complex contexts to define and to integrate new situations that could arise. For example, a messaging system may evolve by offering new objects to define in the messaging. As an example, according to a messaging system associated with a given organisation, an object defining a new alert may be created. This new alert may contain attributes that were not defined previously in the messaging system. Furthermore, it is important that all the players involved in the deployment of such messaging systems apply the same definitions of these objects and integrate their evolutions in order to be interoperable with each other.

One drawback is to redefine for each object a new set of input controls that will be integrated in the message form when a user wishes to indicate the state of a new object, such as for example a new alert. Indeed, this operation has a development cost and requires significant resources to update the changes made in the definition of the new objects of a messaging. Furthermore, it does not guarantee that the implementation of this new object in the messaging can be interoperable with other implementations of this same object.

SUMMARY OF THE INVENTION

The invention aims to overcome the aforementioned drawbacks. Notably, the invention makes it possible to generate a form comprising a set of input controls depending on the analysis of the types of attributes of the new objects to be defined.

An object of the invention relates to a method for generating a message form comprising:

Acquiring a dataset received by means of a communication interface; said dataset comprising at least one object, each object comprising a set of attributes describing the object, each attribute comprising a type;

Storing the received data in a memory, said memory comprising a set of predefined input controls, each predefined input control being associated with a predefined type;

Comparing each type of at least one received object with the set of predefined types of the memory so as to determine a selection of types already referenced in the memory;

Selecting a set of input controls associated with the selected types by the comparing step by means of a processor;

Generating a form comprising a list of selected input controls.

One advantage is to generate automatically a new message form depending on an analysis of types already described in a repository of a memory. One advantage of the invention makes it possible to define manually a new form as a function of each attribute of an object defining a new message.

According to one embodiment, each type describes a set of possible values of an attribute.

According to one embodiment, each object is described in an XSD format, designating "XML Schema Documentation".

According to one embodiment, an input control includes at least one first interactive zone making it possible to define at least one first value of an attribute of an object. According to one embodiment, at least one input control includes a second interactive zone making it possible to input the first value of an attribute of an object.

One advantage is to have available input controls enabling different ergonomics and enabling different forms of inputs of values such as controls for inputting a date from a contextual timetable or by fields free of numeric values.

According to one embodiment, the received dataset includes for each type of each object a set of constraints on the values of an attribute. These constraints may be, for example, a list of permitted values of an attribute. In this example, the step of generating the list of input controls then includes generating for each input control a list of permitted values in an interactive zone of the input control.

One advantage of the invention is to enable an inheritance of the definitions of types already recorded which sometimes include important value constraints. Thus, the invention enables a time saving in the elaboration of a new form integrating a new object of which the types of the attributes are already defined in a memory.

According to one embodiment, the memory stores the permitted values of each predefined type and when a form comprising at least one first input control is generated. According to one embodiment, an automatic search function of the first characters of a value among the list of stored values of the type of the first input control makes it possible to display a sub-list of values.

According to one embodiment, the comparing step includes comparing at least one type of a received object with the set of predefined types of the memory.

The comparing step may also include, when a predefined type corresponds to a type of a received object, comparing the value constraints of the predefined type with the type of a received object.

One advantage is to enable a control of a type and that the identified type indeed corresponds to the possible values of the definition of a new object.

According to one embodiment, when the comparing step ends up in the deduction that a type of an attribute of a received object does not correspond to any predefined type, then an input control defined by default is chosen to be associated with said attribute of the received object.

According to one embodiment, the input control by default is a text field.

One advantage is to enable the realisation of a message form even if the types of the attributes of each object are not already described in the shared repository.

According to one embodiment, the method includes an arrangement of the input controls of the list generated in a visualisation window depending on data determining said arrangement. This data may for example be an attribute of an object or instead an indicator of the terminal used.

According to one embodiment, the data received include a plurality of objects and the method of the invention is applied for each of the identified objects.

According to one embodiment, the arrangement of the input controls depends on the number of identified objects in the received data.

Another object of the invention relates to a messaging system for the implementation of the method of the invention. The system includes:
- a memory for storing predefined data and received data,
- a processor for carrying out the operations of comparing, selecting and generating data of the method of the invention;
- a display unit for generating the input controls of the form.

BRIEF DESCRIPTION OF THE FIGURES

Other characteristics and advantages of the invention will become clearer on reading the detailed description that follows, with reference to the appended figures, which illustrate.

DESCRIPTION

The invention relates to the automatic generation of a message form comprising a set of input controls. Each input control is automatically generated depending on the analysis of received data describing at least one object, its attributes as well as the types of the attributes.

An "object" in the present description designates a message comprising a set of information to describe, the values of which may be documented by at least one input control. An object is dissociated from a message in so far as the message describes other information such as a recipient for example which are independent of the nature of the object. Moreover, a message can contain different objects.

As an example, an object of a message to transmit may be:
- a specific command order;
- a signalling of a third party presence;
- an indication of a displacement of a troop.

The examples cited are in the field of a command messaging system. However, the invention is not limited to this application. The invention relates to all messaging systems.

Each object comprises attributes that characterise it. As an example, the object "indication of a displacement of a troop" may indicate certain attributes such as a troop identifier, a departure position, an arrival position, or even a date. Each attribute includes a type that defines the format of the values of the attribute as well as constraints on the values. The constraints on the values may be of different natures such as, for example, limit values, forbidden values or instead ranges of values. The type may be, for example, a string of characters, an integer type, a float type, an enumerated list, etc.

Each attribute may be defined in a form by the input of a value thanks to an input control. When an object includes different attributes, different input controls make it possible to define the values of these attributes.

According to the embodiments of the invention, a form may include input controls making it possible to define one or more objects in a message.

Figure 1:
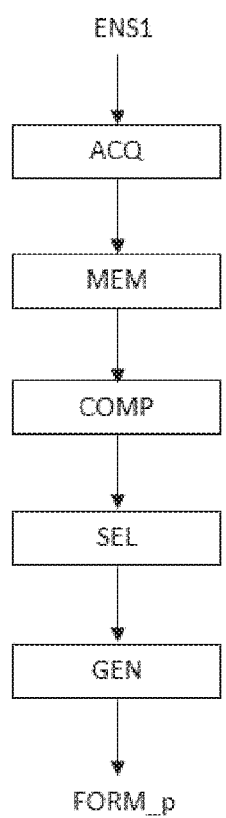
FIG. 1: the main steps of the method of the invention.

FIG. 1 represents the main steps of the method of the invention.

Acquisition of Data

A first step includes the acquisition ACQ of data, noted ENS1, said data include a description of the objects to define in an input form of a messaging. The data ENS1 may be integrated in a file, such as a descriptive file. As an example, a file of which the format is XSD enables such a description, the acronym "XSD" designates "XML Schema Documentation". It will be recalled that the acronym "XML" designates "Extensible Markup Language".

Other file formats may be employed according to the method of the invention.

The acquisition ACQ of data may be realised by means of a communication interface INT which makes it possible to deliver a dataset to a messaging system. This interface makes it possible to acquire data coming from another system or a memory such as a hard disk. Moreover, this interface may be a connection interface to a network such as an internet interface. For example, the data may be received by a message or a request to a remote data server.

Messaging System

Figure 2:
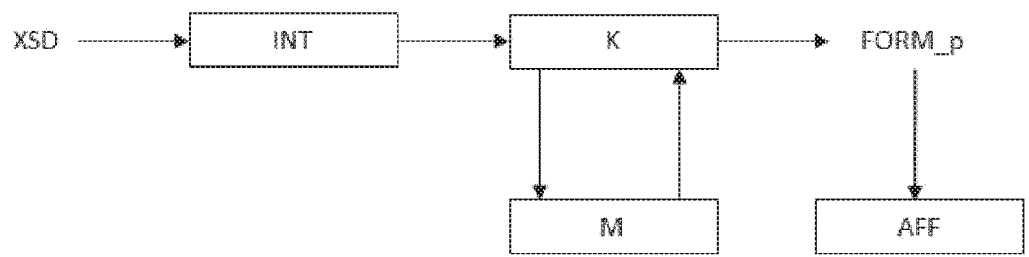
FIG. 2: the system making it possible to generate the forms of the invention.

The acquisition ACQ of data ENS1 is realised by a messaging system having available means making it possible to process said data. The messaging system of the invention notably makes it possible to carry out the main steps of the method of the invention. The messaging system is represented in FIG. 2. Notably, the messaging system makes it possible to acquire and to memorise the transmitted data in a memory M and to process the data from a processor K for carrying out operations of comparing data, selecting data and generating input controls for the creation of a message form FORM_p. The message form FORM_p may be displayed on a visualisation interface, noted AFF, such as a screen of a computer or a mobile terminal.

Recording Data

The method of the invention makes it possible to record received data in the memory M of the messaging system. This step is noted MEM in FIG. 1. According to one exemplary embodiment, the received data ENS1 are recorded in a database, such as for example a relational database.

When the data are contained in a data description file, such as an XSD format file, then a processor of the messaging system is capable of acquiring the data and recording them in a predefined formalism.

According to one embodiment, the comparing steps COMP are carried out before recording MEM the received data. According to another embodiment, the recordings MEM of received data are carried out before the comparing steps COMP.

Shared Repository

The memory of the messaging system of the invention includes data describing predefined types which are associated with input controls. Said data may be defined according to a formalism linked to a repository shared with other messaging systems notably making it possible to describe the types associated with the objects of a form.

Comparing Step

When the data are recorded, the processor is capable of carrying out comparison operations between:
- on the one hand, each type of each of the attributes describing the object identified in the data received with;
- on the other hand, the types already pre-recorded in the memory M.

As an example, a first type "position_1", the coordinates of which are expressed in latitude and in longitude, is associated with a first predetermined input control. The first input control may be, for example, a graphic component enabling the selection of values. The possible values that can be selected may be constrained, for example, by defining:
- permitted minimum and maximum values;
- an authorised number of decimals.

According to another example, a second type designated "position_2" makes it possible to define coordinates defined in space in a heliocentric repository. A second predetermined input control is associated with this second type. A priori in this example, the first input control and the second input control are different. Notably, they each include values and ranges of values reserved for the repository in which the type position_1 and the type position_2 are respectively defined.

The memory M makes it possible to associate with each recorded type a reference or an identifier of a given input control. Thus, the first and the second type of this example are associated with different references of input controls.

When the data received include a set of types, the search for similar types makes it possible to generate the most appropriate controls for defining a form according to the method of the invention.

Selection of Input Controls

When the comparing step determines a predefined type already recorded in the memory M, the input control associated with this type is selected. Thus, the step of comparing the types is succeeded by a step of selecting SEL a set of input controls. Each selected input control is associated with a type of an attribute of a received object of the received dataset ENS1.

Example of Objects

According to one example, the received dataset includes two objects: a first object is "signalling of a position of a detected vehicle" and a second object is "displacement of the troop Tn from the position P1 to the position P2".

The first object may be described by a set of attributes, each attribute being associated with a type {Attribute/Type}, of which notably:
{Identifier of the first object/ID_1 (strings of characters)}
{Class of the vehicle/CLASS_VEHICLE (enumerated list of values)}
{Identifier of the vehicle/ID_2 (string of characters)}
{Nationality of the vehicle/NAT (enumerated list of values)}
{Type of detection/TYPE_DET (enumerated list of values)}
{Position of the vehicle/POS_1 (numeric field: lat/long)}

The second object may be described by a set of attributes, each attribute being associated with a type {Attribute/Type}, of which notably:
{Identifier of the second object/ID_1 (strings of characters)}
{Reference of the troop/REF_TROOP (enumerated list of values)}
{Initial position/POS_1 (numeric field: lat/long)}
{Final position/POS_1 (numeric field: lat/long)}
{Mode of displacement/MODE_DEPLA (enumerated list of values)}
{Date of displacement/DATE (date field)}

The two preceding objects are defined by a list of attributes each having a type. When an XSD file is received describing these two objects, the method of the invention makes it possible to search in the memory for all the types already defined corresponding to the received types and to select them.

In these two examples, the constraints on the values have not been indicated to define each of the types.

Input Control

Each of the selected types is associated in the memory with an input control.

For example, a reference of a troop, of REF_TROOP type, has a value chosen from among a list of possible values that may be selected thanks to an input control. A possible input control for attributing this value may be a dropdown list having predefined values. The input control comprising the list of predefined values may be selected to generate a new form according to the method of the invention.

According to other examples, the input control may be chosen from among the following non-exhaustive list:
a drop box;
a dropdown list comprising a set of values;
a check box;
a numeric input field;
a text input field;
a radio button;
etc.

According to one embodiment, the comparing step COMP of the method includes a step of comparing the constraints of each compared type. Such constraints may be, for example, minimum and/or maximum values, enumerated values, default values, forbidden values, a given number of decimals or instead other constraints defining a type.

This comparison of constraints makes it possible to ensure that the type selected in the memory M indeed corresponds to the type searched for and defined in the received data ENS1.

According to one example, it is possible that the common repository shared by the different messaging systems includes:
- the structures of the objects;
- the types used;
- the definition of the types.

If this repository comprises errors, then the verification of the constraints of the types makes it possible to avoid such errors being sent back and propagated in the generation of a message form by incorrect attributions of input controls.

Thus, if two types having the same identifier or a same name are defined in a repository, the method of the invention makes it possible to verify that it is of the same type.

According to one embodiment, an input control may include a set of interactive zones making it possible to define in different manners the values of the attribute of an object. The different interactive zones such as, for example, a free field making it possible to define a date and an interactive timetable making it possible to select a date returns to the same type defining the values to input. Thus, an input control may include different interactive zones in its graphical representation.

Generation of the Form

The method of the invention includes a step of generating GEN a message form comprising a set of input controls selected by the preceding step of selection SEL.

According to a first embodiment, the input controls are displayed firstly in a contextual visualisation window which is a temporary message form. In this case, an operator can manually arrange the different input controls according to technical constraints linking the different input controls or instead take into account ergonomic considerations. A finalised message form may thus be successfully completed at the end of this latter operation.

According to a second embodiment, the input controls are listed in a visualisation window according to a given order. The order may, for example, be defined according to the dates of selection of the input controls in the memory, or instead according to a predefined sequence or a memorised sequence according to the preceding forms already present in the memory M.

According to a third embodiment, the input controls are arranged according to a predefined model. A plurality of models of messaging forms may be predefined and recorded in the memory M. According to this embodiment, an object may be associated with a model of a family of models of forms in such a way that it is possible to associate with an object a given arrangement of input controls. The arrangement is then realised according to rules predefined by the form model.

According to other alternative embodiments, the arrangement of the input controls depends on the type of terminal used. The display of the input form FORM_p depends, for example, on the terminal used. According to the terminal used, the choice and the arrangement of the input controls may be adapted to a given display of a message form.

As an example, if the terminal is a mobile terminal, the input controls may be adapted to a size of screen or to an optimised arrangement only representing controls essential for their display.

What is claimed is:

1. A method for generating a message form by a messaging system, the method comprising:
   acquiring, by a processor of the messaging system, a dataset received with a communication interface of the messaging system, said dataset being integrated in a file received by the communication interface, data of the dataset comprising at least one object, each object of the at least one object comprising a set of attributes describing said at least one object, each attribute comprising a type;
   storing the data of the dataset received in a memory of the messaging system, said memory comprising a set of predefined input controls, wherein each predefined input control of the set of predefined input controls is associated with a predefined type via a reference or an identifier;
   comparing, by the processor of the messaging system, each type of each of said set of attributes of the at least one object of the data that is received and stored with the predefined type of each predefined input control of the set of predefined input controls of the memory to determine a selection of types already referenced in the memory,
      wherein said comparing comprises ensuring said selection of types already referenced in the memory corresponds to a type of said each type searched for and defined in said dataset received; and
      wherein said comparing said type of said at least one object having a same identifier or a same name as said predefined type defined in said memory, said comparing ensures that said type of said at least one object and said predefined type are of a same type;
   selecting, by the processor of the messaging system, a set of input controls associated with the types selected by the comparing;
   generating, by the processor of the messaging system, the message form comprising a list of said set of input controls that are selected,
      wherein the list of said set of input controls are one or more of
         displayed in a contextual visualization window that is a temporary message form that allows an operator to manually arrange different input controls according to technical constraints linking the different input controls or allows said operator to take into account ergonomic considerations,
         listed in a visualization window according to a given order,
         arranged according to a predefined model,
         arranged dependent on a type of terminal used;
      determining when said memory comprises errors, in response to determining that the memory comprises said errors, said comparing ensures said errors are avoided from being sent back and propagated in said generating of said message form.

2. The method according to claim 1, wherein said each type describes a format and a set of constraints of values of an attribute.

3. The method according to claim 1, wherein said each object is described in XML Schema Documentation "XSD" format.

4. The method according to claim 1, wherein each predefined input control includes at least one first interactive zone used to define at least one first value of an attribute of an object of the at least one object in different manners.

5. The method according to claim 4, wherein the dataset received includes for each type of said each object a set of constraints of values on the at least one first value of an attribute, the set of constraints on the at least one first value corresponding to a list of permitted values, the generating the list of input controls that are selected comprising generating for said each predefined input control said list of permitted values in the at least one first interactive zone of the each predefined input control.

6. The method according to claim 4, wherein the memory stores the set of constraints of values of each predefined type of the set of input controls and the message form comprising at least one first input control of the list of input controls that are selected when the message form is generated, wherein an automatic search function of a first characters of a value among a list of stored values of a type of the at least one first input control results in a sub-list of values to be displayed.

7. The method according to claim 2, wherein the comparing comprises:
   comparing at least one type of said each type of said each object that is received with the predefined type of each predefined input control of the set of input controls of the memory and;
   when the predefined type corresponds to a type of said each object that is received then the set of constraints of the values of the predefined type and the type of said each object are compared.

8. The method according to claim 1, wherein when the comparing ends up in a deduction that a type of an attribute of the each object that is received does not correspond to any predefined type stored in the memory, then an input control defined by default is chosen to be associated with said attribute of the each object that is received.

9. The method according to claim 8, wherein the input control defined by default is a text field.

10. The method according to claim 1, further comprising arranging the list of input controls that are selected in said visualization window depending on data determining said arranging.

11. The method according to claim 10, wherein the data determining said arranging of the selected input controls is a function:
   of an attribute of an object or
   of said type of terminal used to display said message form or
   of said attribute of said object and said terminal used to display said message form.

12. The method according to claim 10, wherein the dataset received comprising a plurality of objects and the method is applied for each object of the plurality of objects identified in the dataset received.

13. The method according to claim 12, wherein the arranging of the input controls that are selected depends on a number of objects identified in the data of the dataset comprising said at least one object that is received.

14. The method according to claim 1, wherein the set of predefined input controls comprise one or more of:
   a drop box;
   a dropdown list comprising a set of values;
   a check box;
   a numeric input field;
   a text input field; or
   a radio button.

15. A messaging system configured to generate a message form, the messaging system comprising:
   a memory configured to store predefined data and a dataset received;
   a display unit configured to display a set of input controls selected from a message form;
   a processor coupled with said memory and said display unit wherein said processor is configured to:
   acquire from the messaging system said dataset received with a communication interface of the messaging system, said dataset being integrated in a file received by the communication interface, data of the dataset comprising at least one object, each object of the at least one object comprising a set of attributes describing said at least one object, each attribute comprising a type;
   store the data of the dataset received in said memory, said memory comprising said predefined data comprising a set of predefined input controls, wherein each predefined input control of the set of predefined input controls is associated with a predefined type via a reference or an identifier;
   compare each type of each of said set of attributes of the at least one object of the data that is received and stored with the predefined type of said each predefined input control of the set of predefined input controls of the memory to determine a selection of types already referenced in the memory,
      wherein said compare is implemented to ensure said selection of types already referenced in the memory corresponds to a type of said each type searched for and defined in said dataset received; and
      wherein said comparing said each type of said at least one object comprises having a same identifier or a same name as said predefined type defined in said memory, wherein said compare ensures that said type of said at least one object and said predefined type are of a same type;
   select said set of input controls associated with the types selected by the compare;
   generate said message form comprising a list of said set of input controls that are selected,
      wherein the list of said set of input controls are one or more of
         displayed in a contextual visualization window that is a temporary message form that allows an operator to manually arrange different input controls according to technical constraints linking the different input controls or allows said operator to take into account ergonomic considerations,
         listed in a visualization window according to a given order,
         arranged according to a predefined model,
         arranged dependent on a type of terminal used;
   determine when said memory comprises errors, in response to determining that the memory comprises errors, said compare ensures said errors are avoided from being sent back and propagated in said generate of said message form.

* * * * *